(12) United States Patent
Hong

(10) Patent No.: US 11,424,510 B2
(45) Date of Patent: Aug. 23, 2022

(54) SEPARATOR HAVING THROUGH-HOLES SEALED BY THERMOPLASTIC POLYMER AND ELECTROCHEMICAL DEVICE INCLUDING THE SAME

(71) Applicant: LG CHEM, LTD., Seoul (KR)

(72) Inventor: Yeon-Suk Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 203 days.

(21) Appl. No.: 16/613,972

(22) PCT Filed: Jan. 17, 2019

(86) PCT No.: PCT/KR2019/000723
§ 371 (c)(1),
(2) Date: Nov. 15, 2019

(87) PCT Pub. No.: WO2019/143156
PCT Pub. Date: Jul. 25, 2019

(65) Prior Publication Data
US 2021/0151832 A1    May 20, 2021

(30) Foreign Application Priority Data
Jan. 17, 2018    (KR) .................. 10-2018-0006231

(51) Int. Cl.
*H01M 50/449*    (2021.01)
*H01M 50/417*    (2021.01)
*H01M 10/0525*   (2010.01)

(52) U.S. Cl.
CPC ..... *H01M 50/449* (2021.01); *H01M 10/0525* (2013.01); *H01M 50/417* (2021.01)

(58) Field of Classification Search
CPC .................. H01M 50/449; H01M 50/417
(Continued)

(56) References Cited

U.S. PATENT DOCUMENTS

2003/0003363 A1*    1/2003    Daido ................. H01M 50/449
                                                      429/231.95
2005/0208383 A1    9/2005    Totsuka et al.
(Continued)

FOREIGN PATENT DOCUMENTS

DE    10 2015 108 068 A1    11/2016
JP    H05-13062 A    1/1993
(Continued)

OTHER PUBLICATIONS

Celgard, Celgard® High Performance Battery Separators, 2009 (Year: 2009).*
(Continued)

*Primary Examiner* — Sean P Cullen
(74) *Attorney, Agent, or Firm* — Morgan, Lewis & Bockius LLP

(57) ABSTRACT

Disclosed is a separator for an electrochemical device, interposed between a cathode and an anode to prevent a short circuit between both electrodes. The separator is provided with through-holes having a diameter of 1-20 μm in the thickness direction, and the surfaces of the through-holes are sealed by being coated with a thermoplastic polymer having a melting point equal to or higher than 70° C. and lower than 130° C. An electrochemical device including the separator is also disclosed. The separator can prevent rapid ignition of an electrochemical device in advance.

16 Claims, 2 Drawing Sheets

(58) Field of Classification Search
USPC .................................................. 429/144, 254
See application file for complete search history.

(56) References Cited

U.S. PATENT DOCUMENTS

| | | |
|---|---|---|
| 2005/0250004 A1 | 11/2005 | McLean et al. |
| 2009/0169945 A1 | 7/2009 | Laurent et al. |
| 2009/0197159 A1* | 8/2009 | Teshima ............... H01M 50/411 |
| | | 429/145 |
| 2012/0015228 A1 | 1/2012 | Yoon et al. |
| 2012/0308871 A1 | 12/2012 | Pascaly et al. |
| 2013/0017431 A1 | 1/2013 | Frisk et al. |
| 2013/0017432 A1* | 1/2013 | Roumi ................ H01M 50/463 |
| | | 361/500 |
| 2013/0040185 A1* | 2/2013 | Takase .............. H01M 10/0569 |
| | | 429/145 |
| 2014/0134717 A1 | 5/2014 | Moon et al. |
| 2014/0162109 A1* | 6/2014 | Ueki .................. H01M 50/449 |
| | | 429/144 |
| 2017/0263907 A1* | 9/2017 | Ameyama ............... C08L 23/06 |

FOREIGN PATENT DOCUMENTS

| | | | |
|---|---|---|---|
| JP | H05-74443 A | | 3/1993 |
| JP | H06-215749 A | | 8/1994 |
| JP | 2005100899 A | * | 4/2005 |
| JP | 2005-268095 A | | 9/2005 |
| JP | 2005-268096 A | | 9/2005 |
| JP | 2006-019146 A | | 1/2006 |
| JP | 2008-192483 A | | 8/2008 |
| JP | 2009-518796 A | | 5/2009 |
| JP | 5717723 B2 | | 5/2015 |
| KR | 10-2006-0087180 A | | 8/2006 |
| KR | 10-2014-0065549 A | | 5/2014 |
| KR | 10-2014-0146932 A | | 12/2014 |
| WO | 01/067536 A1 | | 9/2001 |

OTHER PUBLICATIONS

International Search Report issued in corresponding International Patent Application No. PCT/KR2019/000723, dated May 10, 2019.
Extended European Search Report issued from the European Patent Office dated Sep. 10, 2020 in corresponding European patent application No. 19741414.7.

* cited by examiner

SEPARATOR HAVING THROUGH-HOLES SEALED BY THERMOPLASTIC POLYMER AND ELECTROCHEMICAL DEVICE INCLUDING THE SAME

TECHNICAL FIELD

The present disclosure relates to a separator applicable to an electrochemical device, such as a lithium secondary battery, and an electrochemical device including the same.

The present application claims priority to Korean Patent Application No. 10-2018-0006231 filed on Jan. 17, 2018 in the Republic of Korea, the disclosures of which including the specification and drawings are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. For example, when a polyolefin-based porous polymer is used as a separator in the case of an electrochemical device 100 including a cathode 30, an anode 10 and a separator 20 interposed between the cathode and the anode, as shown in FIG. 1, the polyolefin-based porous polymer substrate used conventionally as a separator for an electrochemical device shows a severe heat shrinking behavior at a temperature of 100° C. or higher due to its material property and a characteristic during its manufacturing process, including orientation, thereby causing a short circuit between a cathode and an anode.

DISCLOSURE

Technical Problem

The present disclosure is designed to solve the problems of the related art, and therefore the present disclosure is directed to providing a separator which has improved safety so that rapid ignition of an electrochemical device may be prevented.

The present disclosure is also directed to providing an electrochemical device provided with the separator.

Technical Solution

In one aspect of the present disclosure, there is provided a separator according to any one of the following embodiments.

According to the first embodiment, there is provided a separator for an electrochemical device, interposed between a cathode and an anode to prevent a short circuit between both electrodes, wherein the separator is provided with through-holes having a diameter of 1-20 μm in the thickness direction, and the surfaces of the through-holes are sealed by being coated with a thermoplastic polymer having a melting point equal to or higher than 70° C. and lower than 130° C.

According to the second embodiment, there is provided the separator for an electrochemical device as defined in the first embodiment, wherein the thermoplastic polymer is moved from the surfaces of the through-holes at a temperature equal to or higher than 70° C. and less than 130° C. so that the sealed through-holes are opened.

According to the third embodiment, there is provided the separator for an electrochemical device as defined in the second embodiment, wherein a micro-short circuit is generated at the opened through-holes.

According to the fourth embodiment, there is provided the separator for an electrochemical device as defined in any one of the first to the third embodiments, which is a porous polymer substrate.

According to the fifth embodiment, there is provided the separator for an electrochemical device as defined in the fourth embodiment, wherein the porous polymer substrate has a melting point equal to or higher than 130° C.

According to the sixth embodiment, there is provided the separator for an electrochemical device as defined in the fifth embodiment, wherein the porous polymer substrate includes high density polyethylene, linear low density polyethylene, low density polyethylene, ultrahigh molecular weight polyethylene, polypropylene, polybutylene, polypentene, or a combination thereof.

According to the seventh embodiment, there is provided the separator for an electrochemical device as defined in any one of the first to the sixth embodiments, wherein the through-holes are formed while being spaced from each other with an interval of 1-300 mm.

According to the eighth embodiment, there is provided the separator for an electrochemical device as defined in any one of the first to the seventh embodiments, wherein the thermoplastic polymer includes poly(cis-chlorobutadiene), poly(trans-chlorobutadiene), poly(ethyl vinyl ether), poly(1-butene), poly(trans-1,4-butadiene), or a combination thereof.

According to the ninth embodiment, there is provided the separator for an electrochemical device as defined in any one of the first to the eighth embodiments, wherein the thermoplastic polymer has a melting point of 86-124° C.

According to the tenth embodiment, there is provided the separator for an electrochemical device as defined in any one of the first to the ninth embodiments, wherein the thermoplastic polymer is moved from the surfaces of the through-holes at a temperature of 86-124° C. so that the sealed through-holes are opened.

In another aspect, there is also provided an electrochemical device according to any one of the following embodiments.

According to the eleventh embodiment, there is provided an electrochemical device including a cathode, an anode and a separator interposed between the cathode and the anode, wherein the separator is defined in any one of the first to the tenth embodiments.

According to the twelfth embodiment, there is provided the electrochemical device as defined in the eleventh embodiment, which is a lithium secondary battery.

Advantageous Effects

The separator according to an embodiment of the present disclosure is provided with through-hole in the thickness direction. Thus, when the temperature is increased beyond a predetermined level, a micro-short circuit is generated to prevent rapid ignition of an electrochemical device in advance.

In addition, since the surfaces of the through-holes are coated and sealed with a thermoplastic polymer, it is possible to prevent a short circuit between the cathode and the anode unless the temperature is increased beyond a predetermined level.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In an aspect, there is provided a separator for an electrochemical device, interposed between a cathode and an anode to prevent a short circuit between both electrodes, wherein the separator is provided with through-holes having a diameter of 1-20 μm in the thickness direction, and the surfaces of the through-holes are sealed by being coated with a thermoplastic polymer having a melting point equal to or higher than 70° C. and lower than 130° C.

Hereinafter, the separator according to an embodiment of the present disclosure will be described in detail with reference to FIG. 2.

Figure 1:
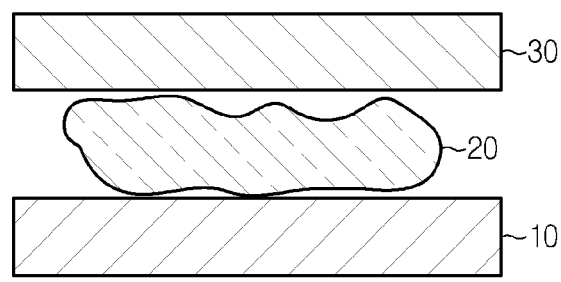
FIG. 1 is a schematic view illustrating the problem of the conventional electrochemical device.
Figure 2:
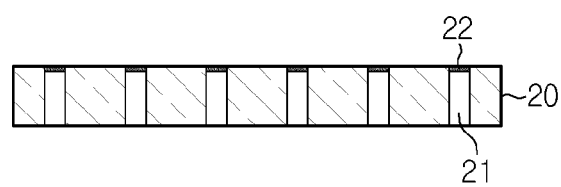
FIG. 2 is a schematic view illustrating the separator according to an embodiment of the present disclosure.

As shown in FIG. 2, the separator 20 according to an embodiment of the present disclosure is provided with through-holes 21 having a size of 1-20 μm. The through-holes may be spaced apart from each other with an interval of 1-300 mm.

In addition, the surfaces of the through-holes 21 are sealed by being coated with a thermoplastic polymer having a melting point equal to or higher than 70° C. and lower than 130° C.

An electrochemical device, such as a lithium secondary battery, including a cathode, an anode and a separator may cause a short circuit between the cathode and the anode, when it is over-charged or when it is in a high-temperature state. In general, such an electrochemical device causes ignition at a temperature of 130-150° C. or higher. Since the separator according to the present disclosure is provided with through-holes, a micro-short circuit is generated through the through-holes. The separator according to the present disclosure consumes electric current by such a micro-short circuit, and disperses and reduces the energy in the electrode assembly by the micro-short circuit, and thus can prevent rapid ignition in advance.

The separator is provided with through-holes having a diameter of 1-20 μm in the thickness direction. Particularly, the diameter of the through-holes may be 1-15 μm, more particularly 9-12 μm. Such a diameter range is larger than the size of pores present in the separator itself as described hereinafter. Within the above-defined range, it is possible to generate a micro-short circuit suitable for preventing rapid ignition of the separator.

According to an embodiment of the present disclosure, the surfaces of the through-holes are sealed by being coated with a thermoplastic polymer having a melting point equal to or higher than 70° C. and lower than 130° C. The thermoplastic polymer seals the surfaces of the through-holes and prevents a short circuit between the cathode and the anode, and then is moved from the surfaces of the sealed through-holes when the temperature of the separator reaches 100° C. or higher after carrying out the subsequent manufacturing process. This results in opening of the through-holes, thereby causing a micro-short circuit.

Figure 3A:
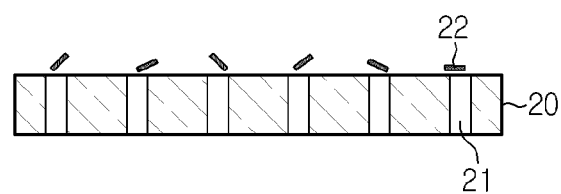
FIGS. 3A and 3B are schematic views illustrating the operating mechanism of the separator according to an embodiment of the present disclosure.
Figure 3B:
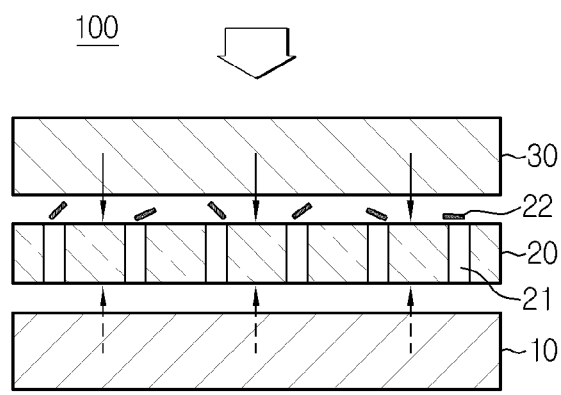

This will be described in more detail with reference to FIGS. 3A and 3B.

As shown in FIG. 2, the through-holes 21 of the separator 20 according to an embodiment of the present disclosure are sealed with the thermoplastic polymer 22.

Then, when the temperature of the separator is increased due to the heat generated from the outside or inside of the separator while the battery is operated by being charged/discharged, the thermoplastic polymer 22 having a melting point equal to or higher than 70° C. and lower than 130° C. is moved from the surfaces of the sealed through-holes 21. This is shown in FIG. 3A.

Since the through-holes 21 exposed by the movement of the thermoplastic polymer 22 have a significantly larger diameter as compared to the pores of the separator itself, a micro-short circuit occurs inside of the exposed through-holes. This is shown in FIG. 3B.

According to an embodiment of the present disclosure, the surfaces of the through-holes are coated and sealed with the thermoplastic polymer. The thermoplastic polymer is a polymer which melts upon heating. On the contrary, when using a thermosetting polymer, there is no effect of heating. In this case, even when the temperature is increased beyond a predetermined range, the through-holes are present in a sealed state and thus cannot generate a micro-short circuit between the cathode and the anode.

The thermoplastic polymer has a melting point equal to or higher than 70° C. and lower than 130° C. Within the above-defined range, it is possible to accomplish desired effects of the present disclosure. Within the above-defined range, the thermoplastic polymer is moved from the surfaces of the sealed through-holes so that the through-holes are opened.

The melting point of the thermoplastic polymer may be 75° C. or higher, or 80° C. or higher, or 84° C. or higher, within the above-defined range. In addition, the melting point may be lower than 130° C., or 125° C. or lower, or 124° C. or lower, within the above-defined range. For example, the melting point may be 86-124° C.

According to an embodiment of the present disclosure, the thermoplastic polymer is disposed on the surfaces of the through-holes present in the thickness direction of the separator.

In other words, according to the present disclosure, the thermoplastic polymer is not introduced during the manufacture of the separator and is not present as a constitutional ingredient of the separator. When the thermoplastic polymer is present as a constitutional ingredient of the separator, it cannot be moved from the surfaces of the through-holes to allow opening of the sealed through-holes, when the temperature is increased beyond a predetermined range. Thus, it is not possible to accomplish desired effects of the present disclosure.

The thermoplastic polymer may include poly(cis-chlorobutadiene), poly(trans-chlorobutadiene), poly(ethyl vinyl ether), poly(1-butene), poly(trans-1,4-butadiene), or a combination thereof.

According to an embodiment of the present disclosure, the through-holes may be formed while being spaced from each other with an interval of 1-300 mm, preferably 10-150 mm, or 50-100 mm. Within the above-defined range, the through-holes may be formed to have an interval suitable for generation of a micro-short circuit. In addition, it is possible to prevent rapid ignition, even when the thermoplastic polymer is moved from the surfaces of the sealed through-holes.

According to the present disclosure, the separator may be a porous polymer substrate.

The porous polymer substrate may have a melting point of 130° C. or higher.

Particularly, the porous polymer substrate may be a porous polymer film substrate.

The porous polymer film substrate may be a porous polymer film including polyolefin, such as polyethylene or polypropylene. Such a polyolefin porous polymer film substrate may realize a shut-down function at a temperature of 100-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination.

In addition, there is no particular limitation in the thickness of the porous polymer substrate, the porous polymer substrate has a thickness of 1-100 μm, particularly 5-50 μm. Although there is no particular limitation in the size of the pores present in the porous polymer substrate and porosity, the pore size and porosity may be 0.01-50 μm and 10-95%, respectively.

The separator according to an embodiment of the present disclosure may be obtained by the following method. First, a porous polymer substrate having a plurality of pores is prepared. Next, through-holes having a diameter of 10 μm are perforated in the thickness direction of the porous polymer substrate. The method for perforating the through-holes is not particularly limited, as long as it minimizes physical damages of the porous polymer substrate, and any method currently used in the art may be used. Then, the surfaces of the through-holes are coated with the thermoplastic polymer having a melting point equal to or higher than 70° C. and lower than 130° C. so that the surfaces of the through-holes are sealed. The method for coating the surfaces of the through-holes is not particularly limited. For examples, a slot coating or dip coating process may be used. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the separator coated and sealed with the thermoplastic polymer as described above is dried by using a dryer, such as an oven, to obtain a separator provided with through-holes whose surfaces are coated and sealed with the thermoplastic polymer.

The electrochemical device according to another embodiment of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

Cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

Artificial graphite as an anode active material, carbon black as a conductive material, carboxymethyl cellulose (CMC) as a dispersing agent, and polyvinylidene fluoride (PVDF) as a binder were mixed with water at a weight ratio of 95.8:1:1.2:2 and mixed to obtain anode slurry. The resultant anode slurry were coated on copper (Cu) foil as an anode current collector to a thickness of 50 μm to form a thin electrode plate, which, in turn, was dried at 135° C. for 3 hours or more and then pressed to obtain an anode.

2) Manufacture of Cathode $LiCoO_2$ as a cathode active material, carbon black as a conductive material and a polyvinylidene fluoride (PVDF) as a binder were introduced to N-methyl-2-pyrrolidone (NMP) at a weight ratio of 96:2:2 and mixed to obtain cathode slurry. The resultant cathode slurry was coated on aluminum foil with a capacity of 3.1 mAh/cm$^2$ to a thickness of 20 μm to obtain a cathode.

3) Manufacture of Separator

A porous polymer substrate (polyethylene F15CK2) having a thickness of 9 μm was prepared and through-holes having a diameter of 10 μm was perforated therethrough with an interval of 50 mm by using a thin needle having a diameter of 15 μm to obtain a separator provided with through-holes. Then, the through-holes were coated with poly(trans-chlorobutadiene) (melting point: 101° C.) through a screen printing process.

4) Adhesion of Separator with Electrode

Then, the separator and an electrode were stacked so that the separator might face the active material layer of the electrode, and then pressing was carried out at a temperature of 90° C. under 8.5 MPa for 1 second to obtain an electrode assembly including a stack of the cathode, separator and anode.

Examples 2-4

Electrode assemblies were obtained in the same manner as Example 1, except that the polymers as shown in the following Table 1 were used.

TABLE 1

|  | Polymers used for sealing | Melting point (° C.) |
|---|---|---|
| Example 1 | Poly(trans-chlorobutadiene) (thermoplastic polymer) | 101 |
| Example 2 | Poly(trans-1,4-butadiene) | 98 |
| Example 3 | Poly(ethyl vinyl ether) | 86 |
| Example 4 | Poly(1-butene) | 124 |
| Comp. Ex. 1 | — |  |
| Comp. Ex. 2 | Polyester | 260 |
| Comp. Ex. 3 | Nylon 6.6 | 65 |
| Comp. Ex. 4 | — |  |

Comparative Example 1

An electrode assembly was obtained in the same manner as Example 1, except that the through-holes were not coated with the thermoplastic polymer.

Comparative Example 2

An electrode assembly was obtained in the same manner as Example 1, except that polyester (melting point: 260° C.) as a thermosetting polymer was used instead of the thermoplastic polymer.

Comparative Example 3

An electrode assembly was obtained in the same manner as Example 1, except that Nylon 6.6 (melting point 65° C.) was used as a thermoplastic polymer.

Comparative Example 4

An electrode assembly was obtained in the same manner as Comparative Example 1, except that a separator having no through-holes perforated through a porous polymer substrate was prepared.

Test Results

Each of the lithium secondary batteries using the separators according to Examples and Comparative Examples was evaluated through an overcharge test. The evaluation data are shown in the following Table 2.

The overcharge test was carried out by charging each lithium secondary battery continuously at 1 C under room temperature until the cut-off voltage of 6V was attained. Herein, each lithium secondary battery was determined for cell ignition and the maximum temperature. The maximum temperature refers to the temperature of the surface of a cell upon the ignition, as determined by using a thermocouple instrument.

TABLE 2

|  | Cell ignition | $T_{max}$(° C.) |
|---|---|---|
| Example 1 | X | 110 |
| Example 2 | X | 107 |
| Example 3 | X | 100 |
| Example 4 | X | 122 |
| Comp. Ex. 1 | ○ | 800 |
| Comp. Ex. 2 | ○ | 750 |
| Comp. Ex. 3 | ○ | 860 |
| Comp. Ex. 4 | ○ | 1000 |

DESCRIPTION OF DRAWING NUMERALS

100: Electrochemical device
10: Anode

20: Separator
21: Through-holes
22: Thermoplastic polymer
30: Cathode

What is claimed is:

1. A combination of a separator and a thermoplastic polymer for an electrochemical device, interposed between a cathode and an anode to prevent a short circuit between both the cathode and the anode,
wherein the separator comprises through-holes having a diameter of 1-20 μm in a thickness direction,
ends of the through-holes that are located adjacent to the cathode or the anode are sealed by being coated with the thermoplastic polymer having a melting point equal to or higher than 70° C. and lower than 130° C., and
the through-holes penetrate through an entire thickness of the separator,
the thermoplastic polymer is the only constituent that seals the ends of the through-holes, and
the thermoplastic polymer is not a constitutional ingredient of the separator.

2. The combination according to claim 1, wherein the through-holes are spaced from each other with an interval of 1 to 300 mm.

3. The combination according to claim 1, wherein the diameter is 1 to 15 μm.

4. The combination according to claim 1, wherein the diameter is 9 to 12 μm.

5. The combination according to claim 1, wherein the thermoplastic polymer comprises one selected from the group consisting of poly(cis-chlorobutadiene), poly(trans-chlorobutadiene), poly(ethyl vinyl ether), poly(1-butene), poly(trans-1,4-butadiene), and a combination thereof.

6. The combination according to claim 1, wherein a melting point of the thermoplastic polymer is 86 to 124° C.

7. The combination according to claim 1, wherein if the separator is subjected to a temperature equal to or higher than 70° C., the thermoplastic polymer is configured to unseal the through-holes to prevent rapid ignition.

8. The combination according to claim 7, wherein the temperature is 86 to 124° C.

9. The combination according to claim 1, wherein the separator is a porous polymer substrate.

10. The combination according to claim 9, wherein a melting point of the porous polymer substrate is equal to or higher than 130° C.

11. The combination according to claim 10, wherein the porous polymer substrate comprises one selected from the group consisting of high density polyethylene, linear low density polyethylene, low density polyethylene, ultrahigh molecular weight polyethylene, polypropylene, polybutylene, polypentene, and a combination thereof.

12. The combination according to claim 9, wherein the porous substrate has pores, and the diameter of the through-holes are larger than a diameter of the pores.

13. The combination according to claim 12, wherein a pore size of the pores is 0.01 to 50 μm.

14. The combination according to claim 12, wherein a porosity of the porous substrate is 10 to 95%.

15. An electrochemical device comprising a cathode, an anode and the combination according to claim 1.

16. The electrochemical device according to claim 15, which is a lithium secondary battery.

* * * * *